(12) United States Patent
Lolli et al.

(10) Patent No.: US 8,746,292 B2
(45) Date of Patent: Jun. 10, 2014

(54) SEALING FLUID CONTAINER ASSEMBLY, AND KIT FOR REPAIRING AND INFLATING INFLATABLE ARTICLES AND EQUIPPED WITH SUCH A CONTAINER

(75) Inventors: Sergio Lolli, Pesaro (IT); Maurizio Marini, Pesaro (IT)

(73) Assignee: TEK Global S.R.L., Pessaro (IT)

( * ) Notice: Subject to any disclaimer, the term of this patent is extended or adjusted under 35 U.S.C. 154(b) by 1136 days.

(21) Appl. No.: 12/675,169

(22) PCT Filed: Aug. 27, 2008

(86) PCT No.: PCT/IB2008/002210
§ 371 (c)(1),
(2), (4) Date: Apr. 8, 2011

(87) PCT Pub. No.: WO2009/027792
PCT Pub. Date: Mar. 5, 2009

(65) Prior Publication Data
US 2011/0180180 A1      Jul. 28, 2011

(30) Foreign Application Priority Data
Aug. 28, 2007   (IT) .................................. TO07A0610

(51) Int. Cl.
*B65B 31/00*    (2006.01)
*B29C 73/02*    (2006.01)

(52) U.S. Cl.
USPC ............... 141/38; 141/197; 141/383; 81/15.6

(58) Field of Classification Search
USPC ............. 141/5, 9, 38, 351, 197, 383; 81/15.6; 152/415
See application file for complete search history.

(56) References Cited

U.S. PATENT DOCUMENTS

| | | | |
|---|---|---|---|
| 7,789,110 B2 * | 9/2010 | Marini | 141/38 |
| 8,146,622 B2 * | 4/2012 | Guan et al. | 141/38 |
| 8,251,105 B2 * | 8/2012 | Lolli et al. | 141/38 |
| 8,491,275 B2 * | 7/2013 | Lolli et al. | 417/313 |
| 2001/0017134 A1 * | 8/2001 | Bahr | 128/204.18 |
| 2009/0301602 A1 * | 12/2009 | Lolli et al. | 141/38 |
| 2011/0180178 A1 * | 7/2011 | Marini et al. | 141/5 |

FOREIGN PATENT DOCUMENTS

| | | |
|---|---|---|
| EP | 1 747 878 | 1/2007 |
| WO | 2005/084968 | 9/2005 |
| WO | 2007/102066 | 9/2007 |

* cited by examiner

*Primary Examiner* — Timothy L Maust
*Assistant Examiner* — Timothy P Kelly
(74) *Attorney, Agent, or Firm* — Ladas & Parry LLP

(57) ABSTRACT

A sealing fluid container assembly (3), connectable to a compressor assembly and to a control circuit of the compressor assembly, has a connecting unit (25) defining a releasable connection to the compressor assembly; and a connecting device (12) for injecting sealing fluid into an inflatable article, and which cooperates releasably with a valve (V) of the inflatable article. More specifically, the container assembly (3) has a sensor carried by the connecting device (12); and at least one electric contact (33) connected to the sensor (12) and cooperating with an electric terminal (24) to transmit a signal from the sensor (12) to the control device when the connecting device (12) is connected to the valve (V); the sensor (12) having a first and a second terminal (40, 39) designed to be short-circuited directly by the valve (V).

12 Claims, 4 Drawing Sheets

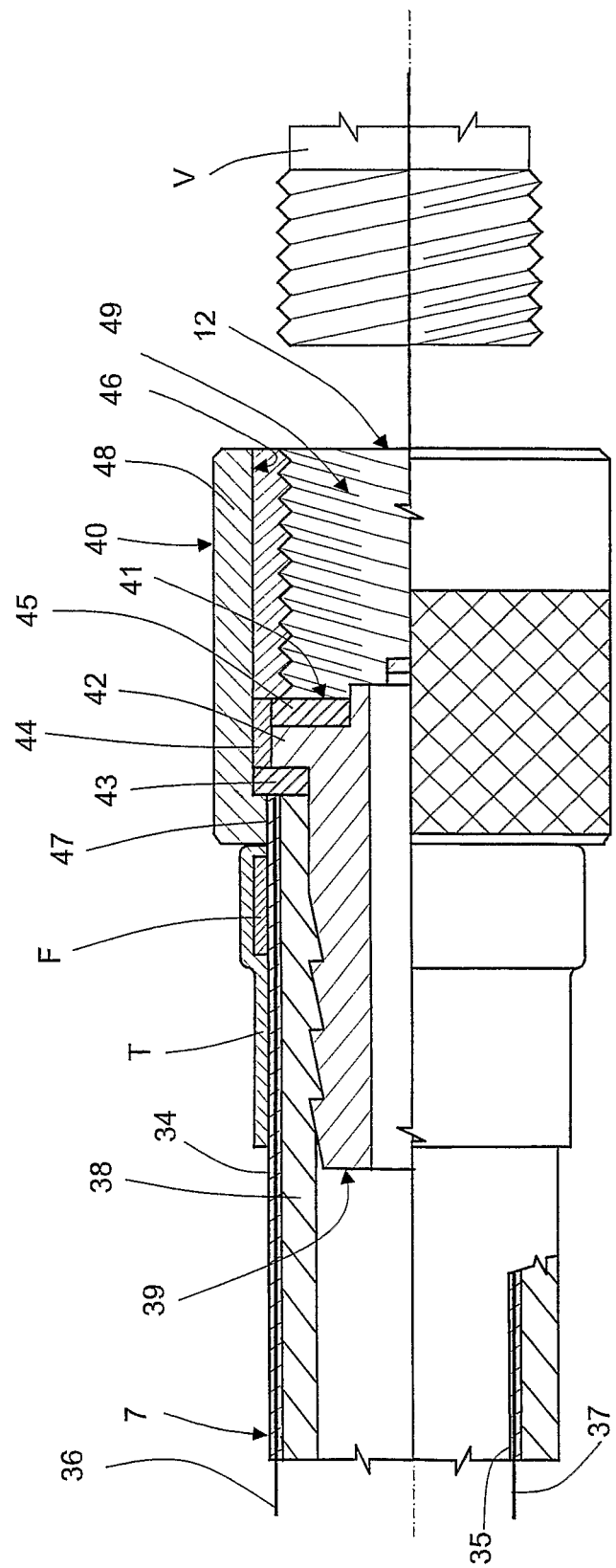

SEALING FLUID CONTAINER ASSEMBLY, AND KIT FOR REPAIRING AND INFLATING INFLATABLE ARTICLES AND EQUIPPED WITH SUCH A CONTAINER

TECHNICAL FIELD

The present invention relates to a sealing fluid container assembly, and to a kit equipped with such a container and for repairing and inflating inflatable articles, such as tyres.

BACKGROUND ART

Kits are known comprising an outer casing; a compressor assembly housed inside the outer casing; and a sealing fluid container assembly connected releasably to the compressor assembly to inject sealing fluid into the tyre. The empty used container assembly is replaced with a new one purchased by the user and reconnected to the compressor assembly.

When using the kit, the user may inadvertently activate the compressor assembly before connecting the container assembly to the tyre, thus wasting sealing fluid and possibly impairing repair if too much sealing fluid is wasted. Moreover, as the user is rarely experienced in performing complex, time-consuming technical operations in tyre-repair situations, a need is also felt for a kit that is extremely simple to use.

DISCLOSURE OF INVENTION

It is an object of the present invention to provide a sealing fluid container assembly connectable to a kit for repairing and inflating inflatable articles and designed to eliminate the aforementioned drawback.

According to the present invention, there is provided a sealing fluid container assembly as claimed in claim 1.

BRIEF DESCRIPTION OF THE DRAWINGS

A preferred, non-limiting embodiment of the present invention will be described by way of example with reference to the accompanying drawings, in which:

FIG. 3 shows a horizontal section of a component part of the FIG. 1 kit;

BEST MODE FOR CARRYING OUT THE INVENTION

Figure 1:
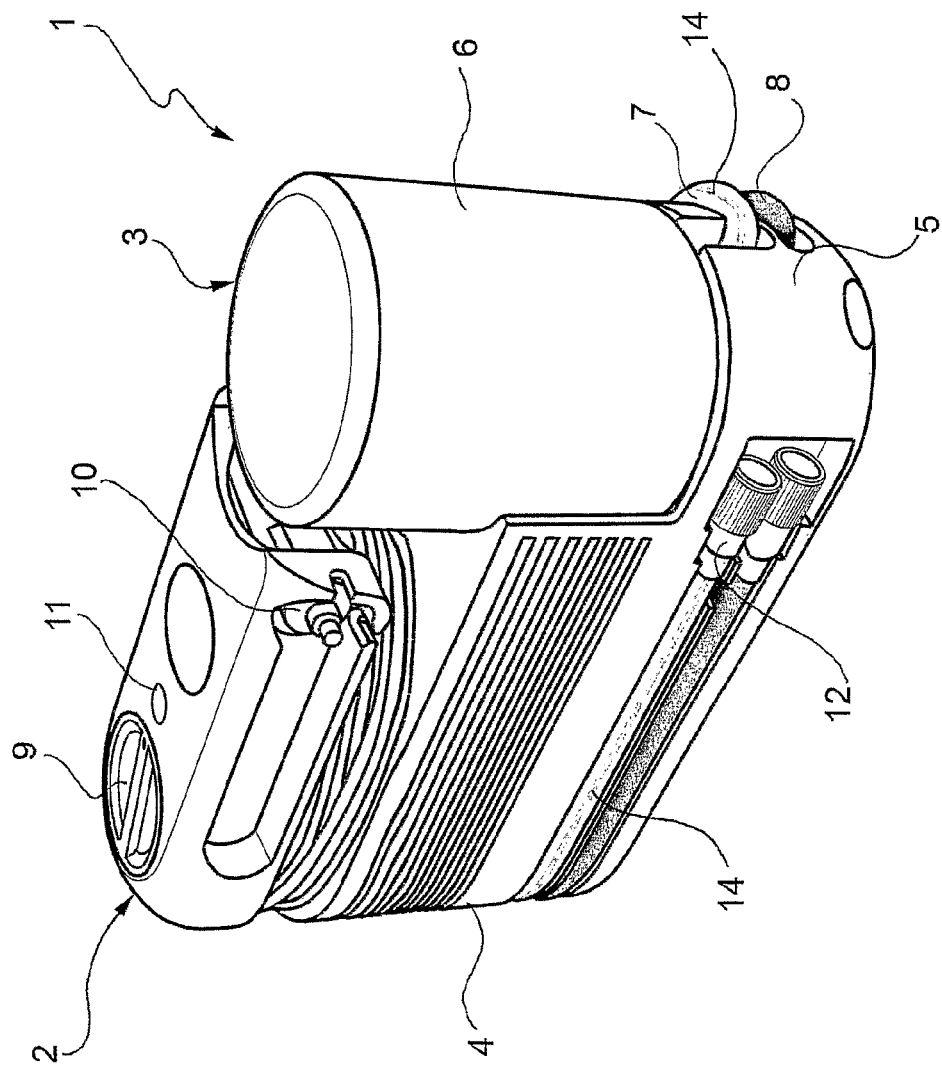
FIG. 1 shows a view in perspective of a kit in accordance with the present invention.

Number 1 in FIG. 1 indicates as a whole a kit for repairing and inflating inflatable articles, and comprising an outer casing 2; a compressor assembly (not shown) housed inside outer casing 2; and a container assembly 3 connected releasably to the compressor assembly.

More specifically, outer casing 2 comprises a substantially parallelepiped-shaped portion 4 housing the compressor assembly; and a projecting portion 5 projecting from the end of portion 4 to define, with portion 4, a seat at least partly housing container assembly 3.

Container assembly 3 contains sealing fluid for repairing a punctured inflatable article, e.g. a tyre, and comprises a bottle 6 positioned upside down in use; and a hose 7 connected to bottle 6 to feed sealing fluid into the tyre.

Kit 1 also comprises a second hose 8 connected directly to the compressor assembly to inflate the tyre without injecting sealing fluid; and control means for selecting a repair mode in which hose 7 and bottle 6 are connected to the compressor assembly, and an inflation mode in which hose 8 is connected to the compressor assembly. For example, the control means comprise a fluid valve switchable by a knob 9 on casing 2, and having two outlets connected to container assembly 3 and hose 8 respectively.

The compressor assembly of kit 1 is controlled by an electronic device fitted inside casing 2 and having an input connected to a power plug 10, and an input connected to a main switch 11. The electronic device is also output-connected to the compressor assembly electric motor to control power to the compressor assembly by means of a safety device, operation of which is described in detail below.

In a preferred embodiment, the safety device of kit 1 is electrical, and is fitted to a connecting device 12 connected to hose 7 and for connecting hose 7 releasably to the safety valve V of the tyre. The safety device, also has two electric terminals connected to a first and second conductor 13, 14 fixed along hose 7.

Figure 2:
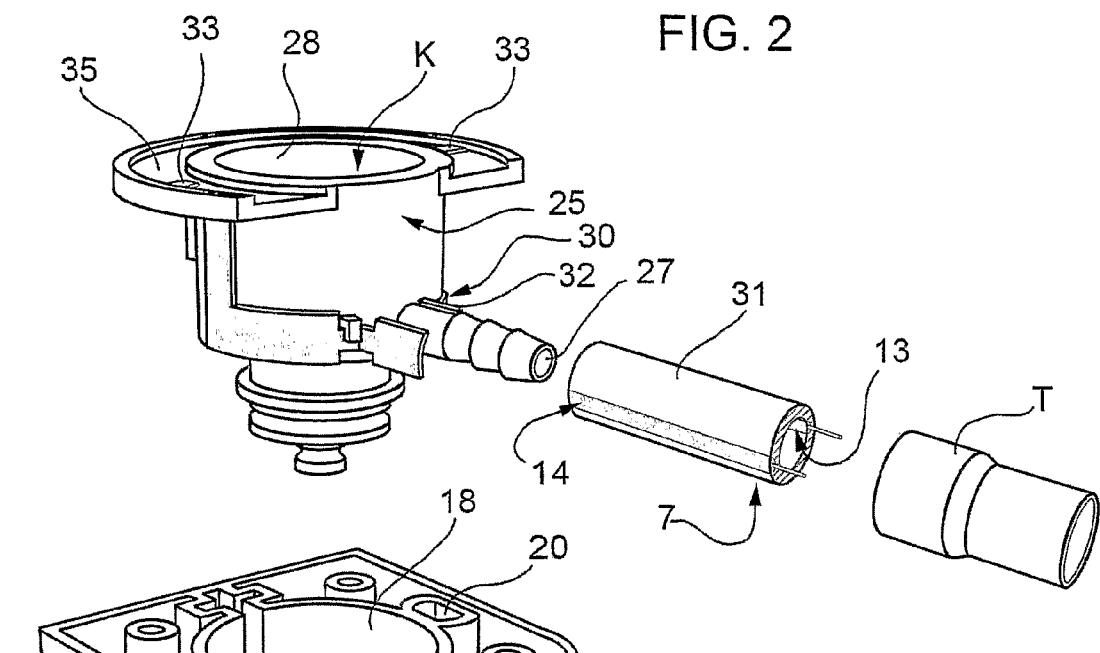
FIG. 2 shows an exploded view of a component part of the FIG. 1 kit.
Figure 2A:
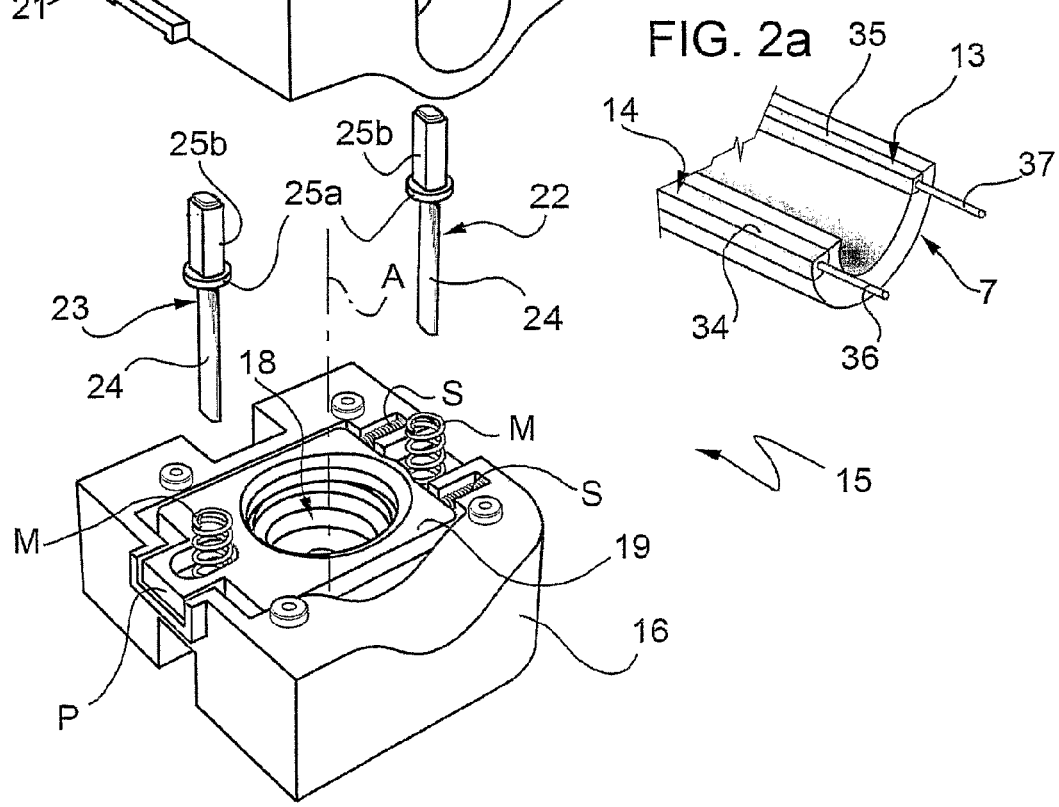
FIG. 2a shows a section of a detail in FIG. 2.

FIG. 2 shows a releasable connecting device 15 fixed inside projecting portion 5 of casing 2 to connect the compressor assembly to container assembly 3, and which comprises a base 16 connected rigidly to projecting portion 5; and a guide member 17 mounted on base 16 to form a single module by which to connect bottle 6 fluidically to the compressor assembly, and container assembly 3 mechanically to casing 2. Base 16 and guide member 17 form a compact parallelepiped, and define a cavity 18 which is open on the side facing container assembly 3, extends along an axis A, and is connected fluidically to the compressor assembly and to the valve switched by knob 9 by a conduit defined at least partly by device 15.

A lock member 19 is mounted between base 16 and guide member 17, is movable crosswise to axis A, and is loaded by elastic means S into a position engaging container assembly 3 inside cavity 18 to prevent movement of container assembly 3 along axis A (position shown in FIG. 2).

Base 16 and guide member 17 define two through holes 20, 21 housing in sliding manner respective ejector devices 22, 23 by which to expel container assembly 3 when the user presses lock member 19, in opposition to elastic means S, by means of a push-button P.

Each ejector device comprises a straight rod 24 parallel to axis A; a supporting insert connected rigidly to rod 24; and a spring M fitted to base 16 to hold the supporting insert in a predetermined position. More specifically, the supporting insert comprises a flange 25a resting against guide member 17 to define the predetermined position; and a portion 25b having a non-circular cross section negatively reproduced by the relative hole 20, 21 to prevent rotation of rod 24.

Rods 24 are of such a length as to project, parallel to axis A, with respect to guide member 17 when container assembly 3 is not connected to releasable connecting device 15.

In a preferred embodiment, rods 24 are made of conducting material, are of such a length as to project from respective holes 20, 21 on the opposite side of guide member 17 to container assembly 3, and are connected to respective inputs of the electronic device of kit 1.

Accordingly, base 16, guide member 17 and/or flange 25a and portion 25b are made of electrically insulating material.

For connection to base 16 and guide member 17, releasable connecting device 15 cooperates with a connecting member 25 of container assembly 3 connected rigidly to bottle 6 and cooperating inside cavity 18 with lock member 19 to lock container assembly 3 to base 16, and with guide member 17 to prevent movement in a plane perpendicular to axis A.

More specifically, connecting member 25 is designed to connect to base 16 in a one-way movement—in the example shown, in a direction parallel to axis A.

Connecting member 25 defines an inlet 26 connected fluidically to the compressor assembly by the conduit defined at least partly by device 15; and an outlet 27 connected to hose 7. More specifically, inlet 26 is connected to outlet 27 via the inside of bottle 6 to define a flow path for the compressed air generated by the compressor assembly when injecting sealing fluid into the tyre. The flow path conveniently extends through a valve (not shown) housed inside bottle 6 to open outlet 27 and control the pressure of bottle 6 and outflow of the sealing fluid along hose 7. For example, the valve is as described in International Patent Application WO-A-2005084968 filed by the present Applicant.

Preferably, inlet 26 is coaxial with axis A, and is carried by a tubular body 28 approximating but no larger than a portion of cavity 18 defined by guide member 17, so as to secure container assembly 3 in directions perpendicular to axis A. More specifically, tubular body 28 defines a cavity K housing the neck (not shown) of bottle 6.

Outlet 27 is crosswise to axis A, and is defined by a tubular member having an inverted-pine-shaped outer profile for connection to hose 7.

Connecting member 25 supports two conductors 29, 30 preferably defined by contoured metal strips and comprising respective end portions 31, 32 alongside outlet 27. Each conductor 29, 30 also comprises a second end portion 33 fitted to a wall 35 projecting, crosswise to axis A, from tubular body 28, so that end portions 33 have respective faces (not shown) facing guide member 17 to define electric contacts with rods 24.

More specifically, end portions 31, 32 are mounted so as to be located outside and inside hose 7 respectively, when hose 7 is fitted to the tubular portion defining outlet 27. To ensure electric connection to end portions 31, 32, conductor 13 is fitted inside hose 7, and is flowed over at least partly by the sealing fluid as it is injected into the tyre.

Conductor 14 on the other hand is fitted to an outer surface of hose 7, and hose 7 is made of electrically insulating, e.g. polymer, material to prevent short-circuiting of conductors 13, 14 along hose 7.

End portion 31 is covered and protected by a sleeve T preferably made of heat-shrink polymer material.

Preferably, each conductor 13, 14 is at least partly embedded in hose 7, and comprises a respective band 34, 35 made of conducting polymer material and coextruded onto hose 7.

Even more preferably, each conductor 13, 14 comprises a respective metal conductor 36, 37 at least partly embedded in respective band 34, 35, so that the signal is transmitted predominantly by the metal conductors, while bands 34, 35 ensure transmission along localized-break portions of the metal conductors.

The ohmic resistance of a possibly damaged conductor 13, 14 therefore substantially equals that of the relative metal conductor 36, 37, since the ends of the damaged conductors still remain close together.

In a preferred embodiment, metal conductors 36, 37 comprise respective wires coextruded simultaneously with respective bands 34, 35 onto hose 7.

Each wire 36, 37 and relative band 34, 35 are thus connected electrically parallel.

Both bands 34, 35 and the body of hose 7 are preferably made of a silicone-based polymer material. For example, the hose is extruded from solid, platinum-catalysed, "R plus 4305" grade silicone rubber, and bands 34, 35 are extruded from electrically conductive "R plus 573" grade HCR silicone rubber.

Figure 4:
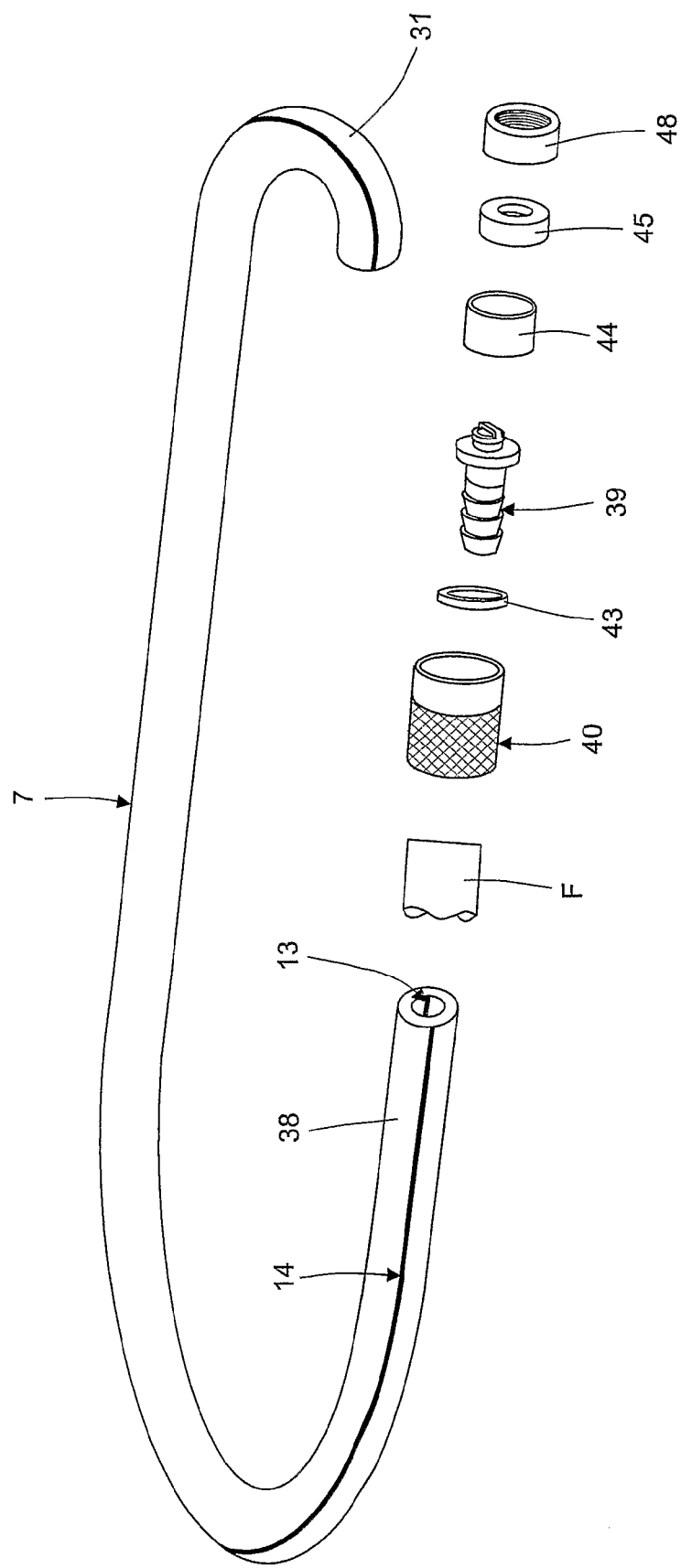
FIG. 4 shows an exploded view of the FIG. 3 component part.

FIGS. 3 and 4 show connecting device 12 fitted to an end portion 38 of hose 7 and defining the safety device controlling turn-on of the compressor assembly.

More specifically, connecting device 12 comprises a tubular insert 39 interference-fitted inside end portion 38; a ring nut 40 that rotates with respect to tubular insert 39; a clamp F for gripping end portion 38 to tubular insert 39; and a second sleeve T surrounding and protecting clamp F.

Preferably, ring nut 40 is guided in rotation by tubular insert 39 by means of a hood 41 conveniently interposed to prevent direct contact between insert 39 and ring nut 40.

More specifically, tubular insert 39 comprises an annular projection 42 outside end portion 38, and hood 41 comprises an annular member 43 located axially between end portion 38 and annular projection 42; an annular member 44 located radially between annular projection 42 and ring nut 40; and an annular member 45 located axially on the opposite side of annular projection 42 to annular member 43.

Ring nut 40 defines a cylindrical inner surface 46 partly contacting annular member 44, and comprises a shoulder 47 projecting from cylindrical inner surface 46 and contacting annular member 44.

Connecting device 12 also comprises an internally threaded bush 48 fixed to cylindrical inner surface 46 to grip annular member 43 against shoulder 47 by means of annular member 44, and to grip annular member 45 against annular projection 42. Ring nut 40 is therefore fixed axially to tubular insert 39, and rotates with respect to it while being supported and guided predominantly by annular member 44.

Tubular insert 39 laterally contacts conductor 13 and preferably band 35, and ring nut 40 is mounted contacting conductor 14. More specifically, tubular insert 39, ring nut 40, and bush 48 are made of electrically conducting material, and hood 41 of electrically insulating material.

For example, shoulder 47 defines a cylindrical surface sized to contact conductor 14, e.g. is smaller in diameter than end portion 38 and so calls for an interference fit to laterally contact conductor 14 and preferably band 34.

Bush 48 is therefore connected electrically to conductor 14 by ring nut 40, and is normally insulated electrically from conductor 13 and tubular insert 39 by hood 41.

FIG. 4 shows how connecting device 12 is fitted to end portion 38 of hose 7.

In actual use, to repair a tyre, ring nut 40 is screwed onto valve V so this contacts tubular insert 39 inside a cavity bounded laterally by bush 48 and at the bottom by tubular insert 39. Bush 48 thus surrounds safety valve V to define a contact crosswise to an axis B of the valve.

Safety valve V is normally made of electrically conducting material, so that, when ring nut 40 is screwed right down, tubular insert 39 and bush 48, and therefore also rods 24 connected to the control device, are short-circuited. More specifically, tubular insert 39 and bush 48 are short-circuited directly by valve V, i.e. with no other, possibly movable, elements in between.

To avoid accidental turn-on, the control device is configured to only turn the compressor assembly on, when main switch 11 is pressed, if rods 24 are first found to be short-circuited.

Connecting device 12 thus defines a contact sensor defining the safety device and having terminals defined respectively by tubular insert 39 and by ring nut 40 with bush 48. The safety device only transmits a signal to the control device if ring nut 40 is screwed right down on safety valve V.

To inflate the tyre using hose 8, on the other hand, knob 9 is set accordingly to connect the compressor assembly fluidically to hose 8. The control device is configured to detect the new setting of knob 9 and so cut off the safety device, so the compressor assembly can be turned on even if rods 24 are not short-circuited.

When hose 8 is connected to safety valve V, the control device therefore only allows the compressor assembly to be turned on if knob 9 is set accordingly and main switch 11 is pressed.

When the kit is turned off and then turned back on, the control system is initiated automatically in repair mode.

Electric contact between container assembly 3 and the electronic device is ensured by the ends of rods 24 contacting relative conductors 29, 30, and is improved by the force exerted by springs M which are movable to take up any slack.

Moreover, when the user presses button P of lock member 19, springs M assist expulsion, and so simplify replacement, of container assembly 3.

The advantages of kit 1 as described above are as follows.

Connecting device 12 defines an electric sensor to safely control turn-on of the compressor assembly, and is simple to produce.

Spring-loaded rods 24, movable in the assembly direction of container assembly 3, ensure reliable electric contact by means of springs M, and also act as an ejector device to expel container assembly 3 when button P is pressed.

Conductors 13, 14 provide for reliable signal transmission; in the event of local damage to metal wire 36, 37, the signal is transmitted by respective band 34, 35.

Electric contacts 33 are fitted to wall 35 to cooperate easily and effectively with, i.e. the ends of, rods 24.

Clearly, changes may be made to kit 1 as described and illustrated herein without, however, departing from the scope of the present invention as defined in the accompanying Claims.

In particular, conductors 29, 30 may be molded on, so that at least end portions 31, 32, 33 are exposed for electric connection to conductors 13, 14 and rods 24.

Base 16 may comprise a non-return valve by which to disconnect cavity 18 from the compressor assembly when container assembly 3 is removed from base 16, and which is preferably controlled to open automatically when container assembly 3 is fitted to base 16.

The invention claimed is:

1. A sealing fluid container assembly connectable to a compressor assembly and to a control circuit of said compressor assembly, and which comprises
    a connecting unit defining a releasable connection to said compressor assembly; and
    a connecting device for injecting sealing fluid into an inflatable article, and which cooperates releasably with a valve of said inflatable article;
    the container assembly comprising a sensor carried by said connecting device; and
    at least one electric contact connected to said sensor and cooperating with an electric terminal to transmit a signal from said sensor to said control device when said connecting device is connected to said valve;
    said sensor comprising a first and a second terminal designed to be short-circuited directly by said valve; and
    further comprising a hose for supporting said connecting device;
    wherein said connecting device comprises a tubular insert fitted inside said hose and a threaded bush [48] screwable to said valve, said insert and said bush short-circuiting said first terminal and second terminal when said valve is connected to said connecting device.

2. A container assembly as claimed in claim 1, wherein said first and second terminal are designed so that said first terminal at least partly surrounds said valve.

3. A container assembly as claimed in claim 1, wherein said first terminal is movable.

4. A container assembly as claimed in 1, wherein a first conductor is connected to said first terminal; and a second conductor is connected to said second terminal; at least one of said first and second conductor being fixed along said hose and contacting laterally said tubular insert.

5. A container assembly as claimed in claim 1, wherein said connecting device defines a cavity for at least partly housing said valve; and said second terminal is located at the bottom of said cavity.

6. A container assembly as claimed in claim 1 wherein said tubular insert is made of electrically conducting material.

7. A container assembly as claimed in claim 1, comprising
    a first conductor connected between the first terminal and said at least one electric contact; and
    a second conductor connected between said tubular insert and a second electric contact connected to said sensor and cooperating with a second electric terminal to transmit a signal from said sensor to said control device when said connecting device is connected to said valve;
    at least one of said first and said second conductor comprising a first and second conducting element connected parallel.

8. A container assembly as claimed in claim 7, wherein said hose and said first conducting element are made of polymer material.

9. A container assembly as claimed in claim 7, wherein said first conductor is located outside said hose, and said second conductor is located inside said hose.

10. A sealant container assembly as claimed in claim 7, wherein the said first conductor is located outside said hose, and said second conductor is located inside said hose.

11. A sealant container assembly as claimed in claim 7, wherein said first and second conductors are embedded in and/or co-extruded on said hose.

12. A kit for repairing and inflating inflatable articles, the kit comprising
    a compressor assembly, and a control device for controlling turn-on of said compressor assembly;
    comprising a container assembly as claimed in claim 1.

* * * * *